Sept. 18, 1956  J. N. NIERATKO  2,763,850
MECHANICALLY CONTROLLED ELECTRICAL SIGNAL LIGHT
Filed Oct. 27, 1951
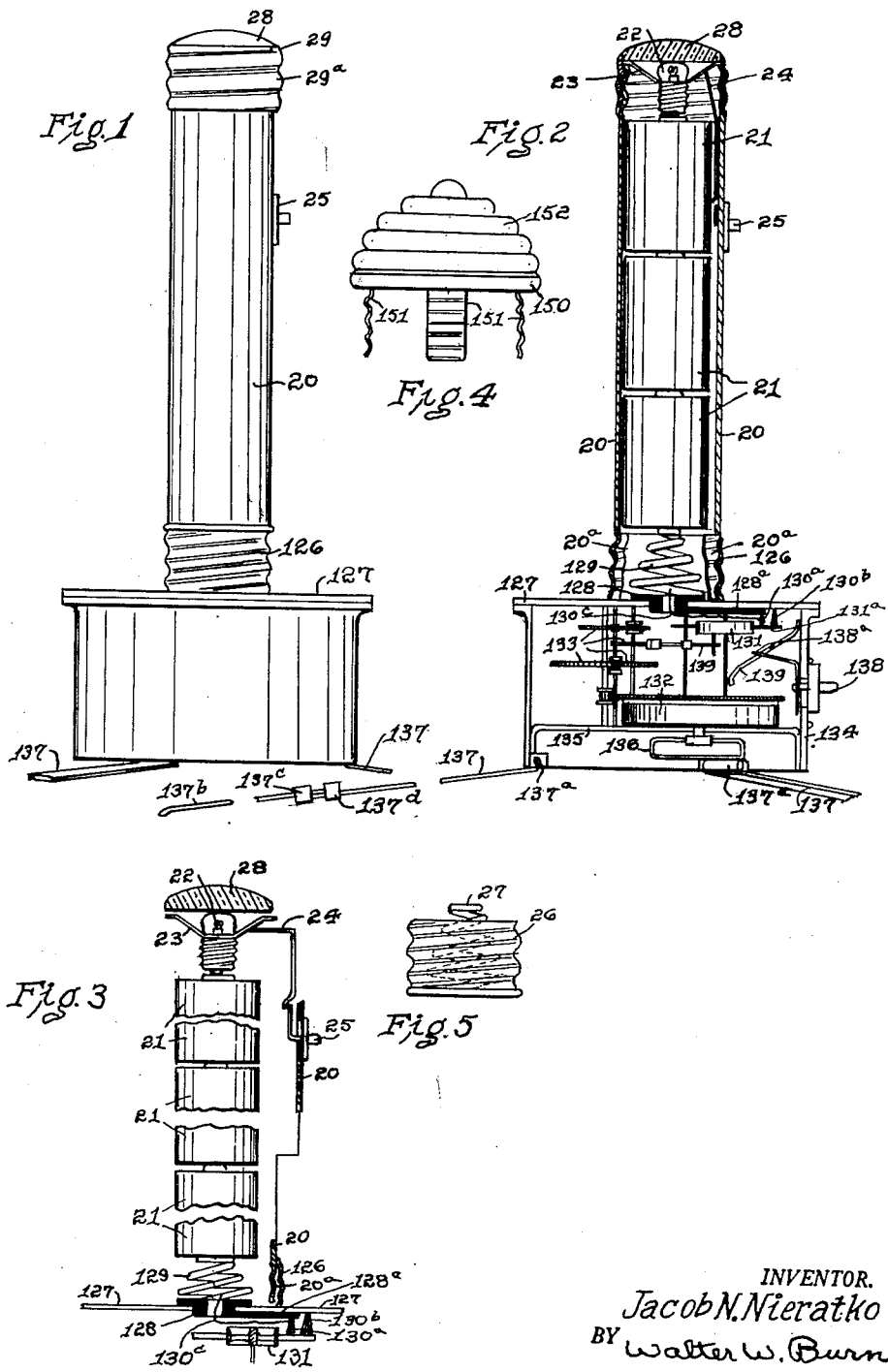
INVENTOR.
Jacob N. Nieratko
BY Walter W. Burns
Attorney

United States Patent Office 2,763,850
Patented Sept. 18, 1956

2,763,850
MECHANICALLY CONTROLLED ELECTRICAL SIGNAL LIGHT

Jacob N. Nieratko, Englewood, N. J.

Application October 27, 1951, Serial No. 253,500

1 Claim. (Cl. 340—22)

This invention relates to signal lights and has particular relation to that class of lights which are used by drivers of stopped or disabled motor vehicles to signal drivers of on-coming vehicles, to observe caution in approaching.

The primary object of this invention is the provision of an improved electric signal light for use of motorists on roads, to warn on-coming vehicles to observe caution in approaching a stopped vehicle.

Another object of the invention is the provision of an improved electric signal light which will utilize the structure of an ordinary electric flash light as a part of the operative structure of the signal light.

Still another object of the invention is the provision of such an improved signal light which does not depend upon heat to cause repeated flashes of a signal such as a red light.

A further object of the invention is the provision of such an improved electric signal light which is provided with mechanical power means to cause repeated flashes from the bulb of an ordinary electric flash light.

A still further object of the invention is the provision of an improved electric flashing signal mechanism which is an attachment to the ordinary electric flash light.

Still another and further object of the invention is the provision of an attachment for an ordinary electric flash light which is provided with a spring operated mechanism which may be at all times kept wound up and ready to be attached, for flashing operation, to an ordinary electric flash light.

Another and still further object of the invention is the provision of such an electric flashing signal mechanism for attachment to the ordinary electric flash light which may be attached to such ordinary flash light and started for the flashing action at the same time.

Other and further objects of the invention will be apparent to those skilled in the art from a reading of the complete specification.

Referring to the drawing where I have illustrated an embodiment of my invention, Fig. 1 is an elevational view of my invention attached to an ordinary electric flash light.

Fig. 2 is a view similar to Fig. 1 but with parts broken away to illustrate the power mechanism and other parts.

Fig. 3 is a diagrammatic view of the electrical connections for giving the flash signals of my invention.

Fig. 4 is a side view of a glass or plastic cap which may be snapped over the usual clear lens of a flash light.

Fig. 5 is a side view of the usual bottom cap of the commercial flash light.

In my invention, a commercial flash light is used in connection with an attachment which replaces the bottom cap, which later carries the spring. In ordinary use, this spring forces the batteries together and outwardly against the central contact of the light bulb. When used as a signal, the bottom cap is not used and my new mechanism is attached.

The common practice of motorists is to carry an ordinary flash light for use in case of trouble. In using my invention, one way to adapt it for best use would be to connect the flash light with the time interval mechanism as soon as night approached and snap the red cap in place. Then in case of engine or light failure, it would be necessary only to set the signal in operation as will be later described, spread the legs and place it in the highway to signal drivers of on-coming vehicles. In this way, practically no time would be lost in getting the signal in operation.

Referring particularly to Fig. 2, 20 designates the shell of one form of commercial flash light having a threaded lower end 20a. Within the shell are three flash light batteries 21 which are arranged with their carbon contacts toward the bulb 22 with the stop carbon-contact in electrical contact with the central contact of the bulb. The bulb is secured with its threaded end in a corresponding socket in the reflector 23. The reflector 23, which is of metal, is insulated electrically from its seat in the top of the shell. An insulated strap 24 runs to the switch 25. The other terminal of the switch is grounded on the shell 20. Outwardly of the reflector 23 is a lens 28, which is held in place by the flanged collar 29, the threads 29a of which coact with corresponding threads in the upper or outer end of the shell 20. Thus, when the switch 25 is turned on, the circuit is completed through the shell 20, its threaded end 20a, the bottom cap 26 and the spring 27. All of this is familiar to those skilled in the art and will not be further covered by detailed description.

I will now describe the portion of my invention which causes the flash signals.

In order to provide a connection to the threads 20a of the shell 20, which normally coact with the threads of the cap 26, I provide a similarly threaded collar 126. This collar 126 is mounted on a plate 127 which forms the top of a base body member which supports the flashing mechanism to be presently described. Centrally of this plate 127 is an insulation member 128 to which is attached a spring contacting member 129. This spring contacting member 129 corresponds to the spring contacting member 27 already described except that it is insulated electrically from the collar 126 and the plate 127 by the insulating plate 128.

Mounted on the lower side of the plate 127 are two very fine wire brushes 130a and 130b which are used to close the flash circuit and give the flash signal which is the main purpose of the invention.

The brush 130a is mounted on the plate 127 by a small insulator 128a and is electrically connected to the spring 129 by a suitable connecting wire 130c. The brush 130b is connected directly to the plate 127 which is made of a suitable metal. Since the collar 126 is mounted on the plate 127, it follows that the collar 126 and the brush 130b are always connected together electrically.

Beneath the plate 127 is pivotally mounted a suitable balance wheel 131 of a clock works. The balance wheel 131 is controlled in its movement by the usual hair spring and escapement mechanism connected to the spring 132 by the usual gear train 133, similar to the usual clock works operated by a hand wound spring.

Attached to the plate 127 is an enclosing member 134 which is provided in its bottom with a hollow bottom member 135. A winding key 136 is provided on the shaft of the spring 132 to provide for placing the spring 132 under tension.

Attached to the lower edge of the hollow bottom member 135 are three hinged telescoping legs which, when extended, form supporting and stabilizing legs to hold the flashing assembly in proper position on the ground. These legs are composed of inner members 137 which are hinged at 137a to the lower rim of the hollow bottom member 135, and outer members 137b which slide on the inner members 137. The inner members 137 have at their outer ends sleeves 137c through which the main body of the outer members 137b pass. The outer members 137d are provided with sleeves which surround the respective inner members 137. These sleeves 137c and 137d are fitted sufficiently loose that the outer members may be pulled out and sufficiently close so that the members will not telescope unless it is intended that they should do so. The hinges 137a are so atached that the inner members may be folded inwardly against the oposite edge of the bottom member 135 but that a rule-joint effect will be obtained, thus holding the legs in a supporting position.

Through the enclosing member 134 is a vertical opening in which is slidably mounted a brake slide 138. On the inside of the enclosing member 134 and in position to be operated by an extension 138a, is a spring brake member 139. The brake member 139 is attached to the inner side of the enclosing member 134 and has its other end in position to rest lightly against the shaft of the balance wheel 131. This slight pressure against the balance wheel is sufficient to stop its movement. But when the slide 138 is moved to its lower position, the spring brake member 139 is withdrawn from contact with the shaft of the balance wheel 131 and the latter is allowed to turn freely. Upon raising of the slide 138, the balance wheel will stop its movement.

There is, on the market, a flash light having a red upwardly extending collar about the clear lens to show a red light when viewed from the side. Such a flash light is suitable for use in my invention. However, to provide for the production of a red signal where no such red collar is present, I have provided a snap-on frame 150 having clips 151 for holding the frame over the outer end of the flash light end. A red lens 152 is provided in the frame for giving the red signal.

I will now describe one method of the use of my invention and its operation when in use.

Let us assume that the flash light for general use has not been prepared for night operation as a danger signal. On the occurrence of trouble necessitating the use of the red signal, the red lens by its frame 150 and clips 151, would be attached to the lens end of the flash light. The cap 26 would be removed and the corresponding socket or collar 126 screwed on. As this is done, movement of the switch 25 and the brake slide 138 may be effected with the fingers of the operator. These movements will connect the electrical connection and, at the same time, release the brake 139 and start the clock mechanism.

If the making and breaking mechanism is constructed to operate at the end of the oscillations of the balance wheel 131, then when the stop 139 is operated, the balance wheel will move out of contact position and the electric current is off.

After this takes place, the extension 131a will alternately close and open electrical connection across the brushes 130a and 130b. As already described, this will cause the passage of electricity through the bulb 22, the switch 25, the shell 20, the threaded portion 20a, the threaded collar 129, the plate 127, the brushes 130b, 130a, the spring 129, the batteries 21 to the central contact of the bulb 22.

As the operator dismounts from his vehicle to place the light in position to signal, he would spread and pull out the legs to extended positions where they may support the flash light in upright position to give out the desired red flashes.

While I have described an illustrated an embodiment of my invention in detail, it is to be understood that modifications and changes may be made without departing from the spirit of the invention and within its scope as claimed.

Having described my invention, what I claim is:

An attachment for the end of an ordinary flash light having a hand-operated switch, comprising a base member, a spring-operated power mechanism supported by the base member, a circuit making and breaking mechanism connected to and operated by the power mechanism, a detachable connection corresponding with the end of the flash light with which it is intended to be used, and for attachment to the flash light end and electrical connections for connecting the making and breaking mechanism to and in the electric circuit of the flash light, a hand operated stop for mechanically cutting off the operation of the machine and breaking mechanism and for holding its contacting member in inoperative position, the bottom of the base member having a road-supporting surface of sufficient dimensions to support the unit in upright position on a highway.

References Cited in the file of this patent

UNITED STATES PATENTS

| Number | Name | Date |
|---|---|---|
| 551,394 | Misell | Dec. 18, 1895 |
| 1,101,540 | Hall | June 30, 1914 |
| 1,106,281 | Chiavetta | Aug. 4, 1914 |
| 1,264,520 | Holmes | Apr. 30, 1918 |
| 1,901,589 | Fullmer | Mar. 14, 1933 |
| 1,951,431 | Meehan | Mar. 20, 1934 |
| 2,025,235 | Gonsett | Dec. 24, 1934 |
| 2,171,349 | Wiley | Aug. 29, 1939 |
| 2,347,532 | Yardeny | Apr. 25, 1944 |
| 2,420,307 | Fristoe | May 13, 1947 |